United States Patent Office 3,736,298
Patented May 29, 1973

3,736,298
POLYISOCYANURATE PREPARATION USING DOUBLE ALKOXIDE CATALYSTS
Paul F. Schmit, Stillwater, and George M. Rambosek, Maplewood, Minn., assignors to Minnesota Mining and Manufacturing Company, St. Paul, Minn.
No Drawing. Filed Sept. 30, 1971, Ser. No. 185,410
Int. Cl. C08g 22/40, 22/46
U.S. Cl. 260—77.5 NC    7 Claims

ABSTRACT OF THE DISCLOSURE

Isocyanates are polymerized, or reacted with polyols, in the presence of double alkoxide catalysts to produce polyisocyanurates or poly(urethane-isocyanurate) polymers.

This invention relates to a process for trimerizing polyisocyanates to produce polyisocyanurates. In another aspect, it relates to a process for reacting polyisocyanates with polyols to produce cross-linked poly(urethane-isocyanurate) polymers.

The trimerization of aliphatic or aromatic monoisocyanates, e.g. phenyl isocyanate and tolylene diisocyanates, to produce isocyanurates is well known. A host of trimerization catalysts have been disclosed for this purpose (e.g. see "Polyurethanes: Chemistry and Technology," Part 1, by J. H. Saunders and K. C. Frisch, Interscience Pub., New York (1962), p. 94, and U.S. Pat. Nos. 2,965,614, 2,979,485, 2,993,870, 3,168,483, 3,179,626, 3,206,352, 3,211,704 3,280,066 and 3,381,008).

Though many of the catalysts disclosed as useful in prior art processes have merit, many of them have undesirable features. Tertiary amines generally have unpleasant odors which detract from their usefulness. Xanthates contain sulfur and are capable of slowly decomposing giving rise to disagreeable odors. Other catalysts are corrosive and hazardous to use and many of the known catalysts are not active at room temperature or have very limited solubility in the reaction mixtures. Some catalysts require long periods of time to achieve adequate trimerization.

Briefly speaking, according to this invention, organic polyisocyanates, including mixtures thereof with polyols, can be readily converted into polyisocyanurate products by catalyzing the trimerization of polyisocyanates with a metal double alkoxide catalyst, such as the potassium complex of the titanium tetraester of triethylene glycol. Preferably, polyisocyanates in the form of isocyanate-capped or -terminated prepolymers per se or in admixture with polyols, such polyalkylene ether glycols or triols or hydroxy polyesters, are polymerized in the presence of said catalysts for example the potassium complex of the iron (III) or molybdenum esters of triethylene glycol, to form cross-linked or cured poly(urethane-isocyanurate) products (or mixed polyurethane-polyisocyanurates).

Generally, the catalysts of this invention do not have disagreeable odors and are not hazardous in use. Some of these catalysts have the property of being active upon admixture at room temperature with the poly-isocyanate or additionally, some of the catalysts are active only at elevated temperatures, providing catalyst-reactant mixtures having a long pot life. The catalysts have wide applicability and polymer products with different desirable properties can be produced from polyisocyanate-polyol reaction mixtures having a wide range of NCO/OH equivalent ratios and such ratios do not have to be closely controlled to insure production of products with desirable properties. Polymer products with particular physical properties can be produced by selecting the proper NCO/OH ratio.

Depending on the degree of cross-linking and the distance between cross-links, the poly(urethane-isocyanurate) products of this invention can range from soft solids or rubbers to hard plastics or resins. The products have a high degree of thermal and hydrolytic stability not enjoyed by prior art polyurethane products. Products can be produced in non-porous form or in cellular or foamed form with open or closed cells, and can be either filled or non-filled. Some products, depending upon their form, can be used as coatings, films, and brush and carpet backings. Some are also useful as adhesives, laminating resins, and as electrical potting resins. Structural or engineering products can also be formed from some products, for example, panels, walls, beams, flooring, tile, etc. In general, these products can be used in various applications heretofore enjoyed by conventional polyurethanes.

The catalysts of this invention are metal double alkoxides or thioalkoxides, i.e. compounds in which a metal atom is chemically bonded to one or more alkyl groups through oxygen or sulfur, the number of alkoxide or thioalkoxide groups attached to the metal atom being equal to the oxidation state, i.e. valence, of the metal atom. Simple metal alkoxides and thioalkoxides can be regarded as derived from alkanols, e.g. having 1 to 18 carbon atoms, by replacement of the hydrogen atom of the hydroxyl group with a metal atom, e.g., NaOCH$_3$, Mg(OCH$_3$)$_2$, Al(OCH$_3$)$_3$ and the like. The catalysts can be obtained for example, by neutralizing, under anhydrous conditions, an acidic alkoxide such as an aluminum, titanium, zirconium, iron (III), tin (IV), or uranium alkoxide, with an alkali metal or an alkaline earth metal alkoxide which is basic, e.g.

Al(OCH$_3$)$_3$+NaOCH$_3$→Na[Al(OCH$_3$)$_4$]

Many of the double alkoxides used as catalysts in the invention are known; see "Encyclopedia of Chemical Technology," Kirk-Othmer, 2nd Ed., vol. 1, p. 840, Interscience Publishers, New York (1967). Examples of useful double alkoxides include the following known compounds:

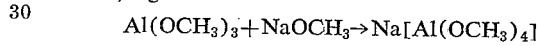

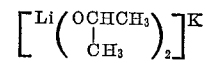

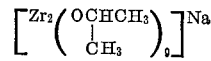

[Zr$_2$(OC$_2$H$_5$)$_9$]Li

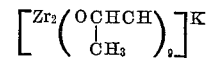

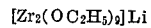

[Al(OC$_2$H$_5$)$_4$]$_2$Mg

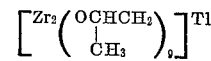

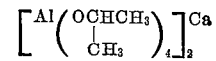

[Al(OC$_2$H$_5$)$_4$]$_2$Co
[Sn$_2$(OC$_2$H$_5$)$_9$]Na
[U(OC$_2$H$_5$)$_6$]$_2$Ca
[U(OC$_2$H$_5$)$_6$]$_3$Al

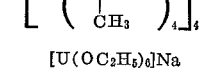

[U(OC$_2$H$_5$)$_6$]Na

Double alkoxides are generally soluble in organic solvents and in many cases volatile, suggesting that they are covalent rather than ionic. Structurally, double alkoxides are coordination compounds or complexes containing a central metal atom, complex anion, and cation.

The double alkoxide catalysts of the invention preferably have the general formula $$[M_x(QR)_y]_zA$$

where "$[M_x(QR)_y]$" is the complex anion, "M" is the "central atom" of the complex anion and A is a metal atom, the preferred metals being transition metals of Groups III–A, IV–A, and V–A elements, e.g., aluminum, antimony, bismuth, chromium, cobalt, iron, nickel, molybdenum, tin, titanium, and zirconium as shown in the Periodic Table of the elements as described in "Handbook of Chemistry," Lange, 19th ed., (1961), pp. 56–57, i.e., excluding non-metals (e.g., boron, and silicon); R is a monovalent or divalent alkyl radical having for example, from 1 to 20 carbon atoms; "Q" is an oxygen or sulfur atom; "A" is the "cation" and is an alkali metal or an alkaline earth metal atom, having a valence of "z"; and "x" and "y" are integers to satisfy the valences of "M" and "QR," respectively.

(The term "double alkoxide" is hereinafter used for convenience as inclusive of double thioalkoxides, unless the context indicates otherwise).

The double alkoxide catalysts of the invention generally have higher hydrolytic stability than corresponding non-metal double alkoxides, e.g. double alkoxides having boron or silicon as a central atom. In fact, some of the double alkoxide catalysts, e.g., the potassium complex of the bismuth tetraalkoxide of triethylene glycol, are inert to the presence of water.

Double alkoxides useful as catalysts in the invention representatively include alkali metal and alkaline earth metal complexes of alkoxides of polyvalent metals, such as esters derived from monohydric alkanols, e.g. having 1–20 carbon atoms, which include methanol, ethanol, propanol, isopropanol, butanol, isobutanol, tertiary butanol, and alkoxides derived from dihydric ether alkanols such as ethylene glycol, propylene glycol, diethylene glycol, triethylene glycol, etc. Also included are the alkoxides derived from similar thio-alkanols such as thiomethanol, thioethanol, thiopropanol, etc. The preferred double alkoxide catalysts are alkali metal or alkaline earth metal complexes of metal alkoxides such as aluminum, antimony, bismuth, chromium, cobalt, iron, nickel, molybdenum, tin, titanium, and zirconium alkoxides derived of the abovementioned alcohols.

The rapidity at which the catalysts gel the polyisocyanate or polyisocyanatepolyol reaction mixture can vary and will be dependent on the particular catalyst used and the amount of the catalyst added to the reaction mixture. Room temperature cure of the reaction mixture will occur with some catalysts of the invention. In other cases, however, the catalyst-contained reaction mixtures are latently curable, i.e., substantially no cure takes place at ambient temperatures, e.g., −30 to 100° F., since the catalysts, e.g., the potassium complex of the bismuth tetraalkoxide of triethylene glycol in such latently curable reaction mixtures are active only at elevated temperature, e.g., 75° C. to 125° C. Catalystic activity at elevated temperatures will be applicable or preferred in some applications. The trimerization or polymerization reactions promoted by the catalysts of this invention are exothermic, and it should be understood that the terms "room temperature cure" or "elevated temperature cure" have reference to the temperature of the environment in which the reaction occurs, elevated temperature cures employing the application of external heat. Generally, the reaction mixtures catalyzed with the catalyst of this invention have moderately low heats of reaction, e.g. 20 to 50 calories per gram of reactant, such that runaway exotherms are not experienced, regardless of the magnitude of the reaction system. When the latent catalysts are incorporated in the reactant mixture, intimate mixing can be achieved without formation of gel particles which otherwise might encapsulate the catalyst and thereby retard or prevent further cure of the system.

The trimerization of polyisocyanates to form polyisocyanurates, using the catalyst of this invention, can be carried out according to prior art manipulative techniques by admixing the polyisocyanate at room temperature, e.g. at 10 to 40° C., with the catalyst and allowing the trimerization to proceed at the autogenous exothermic reaction temperature obtained upon said admixing, or at elevated temperatures, e.g. up to 200° C., to completion. The polymerization of polyisocyanate-polyol mixtures to form products with urethane and isocyanurate linkages can also be carried out by prior art manipulative techniques (generally involving first admixing the polyol with the catalyst) at low temperature or at elevated temperatures, e.g. 0 to 200° C., preferably 20 to 70° C.

The organic polyisocyanate isocyanate reactant materials used in this invention are known in the prior art (e.g. see U.S. Pat. No. 3,054,755) they can be represented by the general formula R(NCO)$_n$, where "R" is aryl, alkyl, or cycloalkyl, and "n" is an integer of 2 to 5. Polyisocyanates can be polymerized or trimerized to form crosslinked polyisocyanurates, such polyisocyanates being trimerized per se with the catalyst of this invention or in admixture with a polyol. Representative polyisocyanates which can be used are aromatic polyisocyanates such as tolylene diisocyanate, diphenylmethane diisocyanate and xylylene diisocyanate. Tolylene diisocyanate, especially mixtures of the 2,4- and 2,6-isomers thereof, such as a mixture of 20 wt. percent of the 2,4-isomer and 80 wt. percent of the 2,6-isomer, is particularly preferred in that it is readily reactive with the preferred polyols, and is economically available commercially. Other suitable diisocyanates include m- or p-phenylene diisocyanate; 1,5-naphthalene diisocyanate; 4,4'-diphenylmethane diisocyanate; hexamethylene diisocyanate; and 3,3'-dimethyl-4,4'-biphenylene diisocyanate. Other useful polyisocyanates include polyisocyanate compositions obtained by phosgenating the polyamides prepared by condensing formaldehyde with aromatic amines. A list of useful commercially available polyisocyanates is found in "Encyclopedia of Chemical Technology," Kirk-Othmer, 2nd ed., vol. 12, pp. 46–47, Interscience Pub., New York (1967).

NCO-capped urethane prepolymers can also be trimerized with the catalyst of this invention to produce poly(urethane-isocyanates) (or urethane-modified polyisocyanurates). Such prepolymers can also be used in admixture with polyols and the mixture catalyzed to produce poly(urethane-isocyanate) products with urethane and isocyanurate linkage. Such NCO-capped prepolymers are well-known (see U.S. Pat. Nos. 3,073,802 and 3,054,755) and are generally prepared by reacting an excess of polyisocyanates, such as an aromatic diisocyanate, with polyalkylene ether polyols or polyester polyols. The isocyanate can also be used in the form of a blocked isocyanate.

The polyol component of the polyisocyanate-polyol reaction mixture is preferably a low molecular weight polyalkylene ether polyol, but may also be a low molecular weight non-polymeric polyol, or a polyester or polyester amide containing reactive hydroxyl groups. The preferred polyols have a molecular weight between about 250 and 3000, more preferably 400 to 3000. Polyols having a molecular weight up to about 5000 are useful. Where a hard product is desired, the polyol preferably should have an average polyol or hydroxyl equivalent weight between about 130 and 400 (i.e. one active —OH group per 130 to 400 molecular weight of polymer). Where softer more rubbery products are desired, the polyol may have one reactive —OH group per 400 to 1000 molecular weight of polymer. The rubbery products preferably should have a crosslink density of about 1 cross-link per 2000 to 20,000 atomic weight units, while the more rigid products have a cross-link density of about 1 cross-link per 400 or 2000 atomic weight units.

Examples of the preferred polyether polyols are polypropylene ether polyols or polybutylene ether polyols, such as the glycols represented by the formula $HO(RO)_nH$. The preferred polyalkylene ether polyols are condensates of ethylene, propylene, or butylene oxide with pentaerythritol, sorbitol, sucrose, methylglucosides, or low molecular weight polyols, such as propylene glycol, tri-, tetra-, penta-, hexamethylene glycols, 1,3-butylene glycol, 1,3-(2 ethyl) hexane diol, 2,2,4-trimethyl-1,3-pentanediol, trimethylol propane, 1,2,6-hexane triol, or phenyldiisopropanolamine. The low molecular weight polyols mentioned above can also be used, and preferably blended, with polymeric polyols as components in the reaction mixture.

Useful polyesters include castor oil, derivatives thereof, and those generally prepared by the esterification reaction of an organic dicarboxylic acid or anhydride with an alkylene oxide polyol. The preferred polyols are ethylene, propylene, and butylene oxide polyester polyols having two or more hydroxyl groups. The acid or anhydride may be selected from a wide variety of polybasic acids, such as malonic, succinic, glutaric, adipic, pimelic, sebacic, acids prepared by dimerization or trimerization of unsaturated eighteen carbon fatty acids, and others. The reactants are combined in molecular ratios to provide hydroxyl terminating groups on the polyester molecules. In the formation of these polyesters, it is quite common to provide mixtures of acids and anhydrides with mixtures of glycols and other polyols. The acid number may be controlled by methods known in the art, and is usually low, being under five.

Generally, the polyol-polyisocyanate reaction mixtures cured with the catalyst of this invention can have NCO/OH equivalent ratios in the range of 0.8/1 to 12/1, and even higher, e.g., 20/1 to 40/1; the preferred range is at least 1.2/1 since below the latter the product will contain unreacted or free hydroxyl groups (which have a plasticizing function) and will be a more flexible product. Poly(urethane-isocyanurate) products made from reaction mixtures having NCO/OH ratios of 0.8/1 to 1.2/1 can be characterized as isocyanurate-modified polyurethanes. Those poly(urethane-isocyanurate) products made from reaction mixtures with NCO/OH ratios of 1.2/1 and greater, e.g., 3/1 to 12/1, can be characterized as urethane-modified polyisocyanurates. The preferred products are those which are highly cross-linked by reason of having substantially all of the available —NCO groups of the polyisocyanate reactant converted into isocyanurate linkages. For such, reaction conditions will be selected favoring trimerization of the available —NCO groups rather than for formation of urethane, urea, allophanate, or biuret linkages. In general, regardless of the NCO/OH ratio, the poly(urethane-isocyanurate) (or mixed polyisocyanurate-polyurethane) products of this invention have an amount of isocyanurate linkage in the polymer backbone sufficient to provide a heat stable product, i.e. a product which retains 75 to 100% of its room temperature hardness when heated at elevated temperature, e.g., 1 hour at 300–500° F.

The amount of catalyst used in polymerizing the isocyanate or polyol-polyisocyanate reaction mixtures of this invention will vary, depending on the particular catalyst reactant used, and the desired activity of the catalyst. Generally, the amount of catalyst to use will be less than 10 wt. percent of the isocyanate reactant, and usually from 0.5 to 5 wt. percent of the isocyanate. Functionally stated, the amount of catalyst to use will be that amount sufficient to catalyze the polymerization or trimerization of the reaction mixture at the desired temperature.

Where a higher cross-linked or chain-extended product is desired, the polyol-diisocyanate reaction mixture can include a conventional trifunctional isocyanate or a triol. The reaction mixture can also include modifying monoisocyanates or alcohols such as 1,4-butane diol, butyl cellosolve, butyl carbitol, oleyl alcohol, etc., to impart special properties to the polymer product, such as the degree of final hardness.

Filled polymer products can be made by incorporating into the reaction mixtures a host of different powdered or finely divided fillers (e.g., 5 to 25 wt. percent of the mixture), such as clay, talc, rubbery granular aggregate, titanium dioxide, diatomaceous earth, glass microbubbles and the like. Glass spheroids are useful in making light-weight isocyanurate - modified polyurethane syntactic foamed articles which can be finished by sanding. Co-reactant materials such as the diamines described in U.S. Pat. No. 3,248,454 can be included in the polyol-polyisocyanate reaction mixture, e.g., to increase the viscosity of mold-ability thereof as well as to increase the hardness of the resulting product. Fire retardant fillers, such as polyvinyl chloride and antimony or phosphorus compounds, can also be incorporated into the reaction mixture. Foamed or porous products of this invention, such as those having urethane as well as isocyanurate linkages, can be made by incorporating a small amount of water (which will result in some urea linkages being formed in the polymer) and/or by blowing the reaction mixture with a blowing agent such as trichloromonofluoromethane or other low molecular weight gaseous haloalkanes. Conventional foam stabilizing agents such as silicone oils or organosilicones can also be incorporated into such reaction mixtures to obtain foamed products with controlled porosity. A perfluoroalkyl amine, such as those disclosed in U.S. Pat. No. 3,378,399, can be used as a foam stabilizer. Conventional catalysts can be used as co-catalysts in conjunction with the catalysts of this invention, particularly in making room-temperature curable polyurethanes. Such conventional catalysts include polyol soluble organic compounds of certain polyvalent metals, e.g., tin, lead, or mercury (see British Pat. No. 1,053,383). Generally, the amount of co-catalyst will be less than 10 wt. percent of the total weight of the mixture, and usually less than 5 wt. percent. Examples of such co-catalysts are phenylmercuric acetate, phenylmercuric oleate, mercuric octoate, mercuric naphthenate, lead octoate, lead naphthenate, dibutyl tin dilaurate, dibutyl tin diacetate, and similar compounds.

The polymeric products of this invention will generally have relatively high heat resistance and hydrolytic stability. They can range from soft solids to hard plastics. Elastomeric or rubbery materials can also be prepared.

The rubber or elastomeric urethane - isocyanurate products of this invention can be used to provide paving surfaces, particularly such as those tracks used for athletic or sporting purposes, and as coatings to provide protective surfaces, for example as rain-proof or water-resistant coatings for clothing. They can be used as laminating resins for sheets of glass fiber and as adhesives for bonding metal to metal, wood to wood, and metal to wood, and as potting compositions for insulating magnet coils or other electrical devices. The hydrolytic stability of the isocyanurate-urethane products of this invention means that they can be shaped in the form of articles that are subject to moisture contact during use or which come into contact with aqueous solvents or water, such as gaskets, seals, etc.

Objects and advantages of this invention are further illustrated by the following examples, in which the "parts" referred to are parts by weight.

EXAMPLE 1

A double alkoxide lithium complex of the aluminum ester of triethylene glycol having a chemical structure as indicated by the aforementioned double alkoxide general formula was prepared by reacting 450 parts triethylene glycol, $(HOCH_2CH_2OCH_2)_2$ hereinafter called "TEG," with 6.3 parts $LiAlH_4$ as follows:

The TEG was dried prior to the reaction by first charging it into a three-neck flask fitted with charge tube, stirrer, and an outlet connected to a vacuum system. The TEG was heated with stirring at 100° C. for one hour while maintaining a pressure of about 30 mm. Hg. The TEG was cooled to below 50° C. and about 40% of the $LiAlH_4$ was added to the contents of the flask through the charge tube while maintaining stirring, resulting in an exotherm which abated after about 30 minutes. The contents of the flask were again cooled to below 50° C. and the remaining $LiAlH_4$ was similarly added to the flask. After the resulting second exotherm abated, the flask was heated with stirring at 75° C. for about 60 minutes to produce said lithium complex of the aluminum alkoxide of triethylene glycol.

EXAMPLE 2

A prepolymer mixture, hereinafter called "Prepolymer A," having a viscosity of 450–950 cps. and an isocyanate equivalent of 171–175, was prepared by reacting 67 parts of toluene diisocyanate with a mixture of 17.3 parts of polypropylene ether glycol having a molecular weight of 2000 and 16 parts of polypropylene ether diol having a molecular weight of about 200.

Fifty parts of prepolymer A was mixed at room temperature with four parts of said lithium complex catalyst of Example 1 and the mixture allowed to cure at room temperature. A solid cured resinous product having a Shore D hardness of 80 was formed after the mixture had been allowed to stand for about two minutes.

EXAMPLE 3

A double alkoxide potassium complex of the titanium alkoxide of triethylene glycol was prepared by reacting 225 parts TEG with 47.5 parts $TiCl_4$, and reacting this with 42 parts potassium hydroxide. The TEG was dried according to the procedure described in Example 1. The $TiCl_4$ was added slowly through the charge tube resulting in an exotherm which was maintained by cooling at less than 100° C. The contents of the flask were heated to 130° C. with stirring for 90 minutes upon completion of the addition of the $TiCl_4$. The pressure in the flask was not permitted to rise above 30 mm. Hg. during the entire sequence of steps. The potassium hydroxide was added and the heating and stirring were continued for about one hour producing a dark brown liquid containing precipitated potassium chloride. The potassium chloride was removed by filtration leaving the catalyst as a clear dark brown liquid.

EXAMPLE 4

A prepolymer mixture, hereinafter called "Prepolymer B," having a viscosity of 1840 cps. and an isocyanate equivalent of 216, was prepared by reacting 155 parts of methylene-bis (phenylisocyanate) with a mixture of 23.75 parts of polypropylene ether glycol having a molecular weight of 200 and 26 parts of a polypropylene ether diol having a molecular weight of about 2000.

Fifty parts of prepolymer B was mixed at room temperature with two parts of the catalyst of Example 3, and mixture allowed to cure at room temperature. A solid product having a Shore D hardness 80 was formed after the mixture had cured for two minutes.

EXAMPLE 5

A double alkoxide sodium complex of the ferric alkoxide of triethylene glycol was prepared by reacting 20 parts sodium methoxide with 15 parts $FeCl_3$, and reacting this with 150 parts dried TEG. To a mixture of 100 parts denatured ethyl alcohol, 20 parts sodium methoxide, and ½ part pyridine, in a heated three neck flask was added the $FeCl_3$ in three equal increments. Such addition produced an exotherm which was maintained under 45° C. by cooling. The TEG was charged into the flask which was first heated to 90° C. The contents of the flask were placed under vacuum to remove methyl and ethyl alcohol produced during the reaction. The reaction was continued at 100° C. for one hour to produce the desired catalyst.

Six parts of the catalyst were mixed with 100 parts prepolymer A to produce a cured polymer after seven minutes of room temperature curing. The cured polymer had a Shore D hardness value of 80.

EXAMPLE 6

A double alkoxide sodium complex of the chromium alkoxide of triethylene glycol was prepared by reacting 21 parts sodium methoxide with 14 parts anhydrous $CrCl_3$, and reacting this with 150 parts TEG at 110° C. for two hours according to the method described in Example 5.

Six parts of catalyst reaction mixture was added to 100 parts prepolymer A which after 1½ minutes of curing at room temperature produced a cured polymer. The cured polymer had a Shore D hardness value of 83.

EXAMPLE 7

A double alkoxide sodium complex of the cobalt alkoxide of triethylene glycol was prepared by reacting 10 parts sodium methoxide with 65 parts $CoCl_2.6H_2O$, and reacting this with 150 parts TEG according to the method described in Example 5.

Fifteen parts of catalyst reaction mixture was added to 100 parts prepolymer A to produce a cured polymer after two hours of curing at 200° F. The cured polymer had a Shore D hardness value of 82 and was dark blue in color. The catalyst-prepolymer A mixture did not cure on standing for two hours at room temperature, indicating the latent nature of the catalyst.

EXAMPLE 8

A double alkoxide sodium complex of the titanium alkoxide of n-butyl alcohol was prepared by reacting at 40° C. 100 parts n-butyl alcohol with 3.4 parts sodium metal, and reacting this with 50 parts tetra-n-butyl orthotitanate at 50° C. for two hours with stirring. Excess butyl alcohol was removed by vacuum distillation to leave a viscous brown syrup containing the desired catalyst. The syrup was diluted with an equal portion of TEG, and one part of the diluted catalyst containing mixture added to 25 parts prepolymer A. A room temperature cure of this mixture was effected in about one minute. The resultant cured polymer had a Shore D hardness value of 80. A control mixture of one part tetra-n-butyl orthotitanate and 25 parts prepolymer A did not cure after standing several hours at room temperature, thereby indicating the lack of catalyst activity of the tetra-n-butyl orthotitanate under the above conditions.

EXAMPLE 9

A double alkoxide potassium complex of the bismuth alkoxide of triethylene glycol was prepared by reacting 63 parts $BiCl_3$ with 100 parts methyl alcohol under reflux for one hour at 85–90° C. Methyl alcohol produced in the resulting reaction was removed by evaporation and the heating was continued for one hour. Thereafter 25 parts KOH was added with stirring to produce the desired catalyst. Water formed in the reaction was removed by the addition of 100 parts toluene which formed an azeotrope mixture with the water. The toluene azeotrope mixture was removed by vacuum distillation. The catalyst was removed as a solid by filtration, and purified by washing with water to remove the potassium salts.

EXAMPLE 10

The double alkoxide catalyst of Example 9 was dispersed in an equal weight of TEG and one part of the mixture was mixed to 100 parts of prepolymer B. The prepolymer-catalyst mixture was divided into two equal portions to show the latent mixture of this catalyst. The first portion was heated at 225° F. for one hour to form a solid cured polymer. The second portion was stored and remained liquid for a period of 60 days. After the 60 days had passed the liquid was heated at 225° F. for ten minutes to form a solid cured polymer.

EXAMPLE 11

A double alkoxide potassium complex of the molybdenum alkoxide of triethylene glycol was prepared by reacting 27.35 parts MoCl₄ in three aliquots with 100 parts methyl alcohol under reflux according to the method described in Example 9. Excess methyl alcohol was removed by evaporation and 150 parts triethylene glycol was added. The mixture was then heated at 130° C. for one hour. After removal of the resultant methyl alcohol 5.6 parts KOH was added to provide the desired catalyst. The resultant water was evaporated and the catalyst was removed by filtering.

EXAMPLE 12

Five parts of the catalyst of Example 11 was mixed with 100 parts of prepolymer B. The mixture remained liquid after heating to 250° F.

A polyol base was prepared by mixing 125 parts polypropylene ether triol having a molecular weight of 440, 125 parts of polypropylene ether triol having a molecular weight of 740, 100 parts polyvinyl chloride (PVC 71AH), and 89 parts antimony trioxide. A mixture consisting of 25.5 parts polyol base and 30 parts prepolymer B to give an NCO/OH ratio of 1.05/1.0, was prepared. To this mixture was added one part of the catalyst of Example 11. From this mixture a cured polymer having a Shore D hardness value of 40 was produced after four minutes of curing time at room temperature. The lack of reactivity of the catalyst with prepolymer B in the first instance as compared to the reactivity of the catalyst with the polyol base mixture with prepolymer B indicates the selective nature of this catalyst. Such selectivity indicates a preference for urethane polymerization rather than isocyanurate trimerization.

EXAMPLE 13

A double alkoxide potassium complex of the antimony alkoxide of triethylene glycol was prepared by reacting 36.5 parts $Sb_2O_3$ with 225 parts triethylene glycol at a temperature of 130° C. and a pressure of 25 inches of mercury with a dry air flush for two hours. Nine parts KOH were added with continued heating to produce the desired catalyst. To 25 parts prepolymer B was added one part of the catalyst mixture resulting in a hard cured resin after about three minutes curing time at room temperature.

EXAMPLE 14

A double alkoxide catalyst composition was prepared by first heating 61 parts titanium orthobutanate and 270 parts 1,4 butanediol at 130° C. for one hour in a flask fitted with a stirrer, thermometer, and reflux condenser with a trap. The mixture was cooled to about 80° C. and 23 parts potassium hydroxide was added thereto to complete the reaction.

EXAMPLE 15

TABLE 1

| Amounts of ingredients, parts by weight | Foam | | | | |
|---|---|---|---|---|---|
| | A | B | C | D | E |
| Triol [a] | 50 | 48.2 | 48.2 | 48.2 | 48.2 |
| Perfluoroalkylamine [b] | 1 | 1 | 1 | 1 | 1 |
| CFCl₃ ("Freon" 11) | 6.5 | 6.5 | 6.5 | 6.5 | 6.5 |
| Isocyanate prepolymer [c] | 45.5 | 64.4 | 64.4 | 129.0 | 129.0 |
| NCO:OH mol ratio | 1.05:1.00 | 1.5:1 | 1.5:1 | 3:1 | 3:1 |
| Catalyst | 0.5 | 1.0 | 8.0 | 1.0 | 8.0 |

[a] Polypropylene oxide polyether triol having an average molecular weight of about 710 and a hydroxyl number of about 237.
[b] Perfluoroalkylamine having the chemical formula

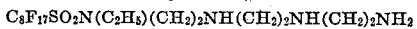

$C_8F_{17}SO_2N(C_2H_5)(CH_2)_2NH(CH_2)_2NH(CH_2)_2NH_2$

[c] Isocyanate prepolymer having a viscosity of 1840 cps. and an isocyanate number of 216, prepared by reacting 155 parts methylenebis (phenyl isocyanate) with a mixture of 23.75 parts polypropylene ether glycol having an average molecular weight of 200 and 26 parts of polypropylene glycol having an average molecular weight of 2000.

Foams A to E were prepared of the ingredients shown in Table 1 above using the number of parts shown by mixing the triol, perfluoroalkylamine, and catalyst in a first feed vessel, the remaining ingredients in a second feed vessel, feeding the mixtures from each vessel into a common mixing chamber at rates sufficient to obtain the indicated NCO:OH ratio, the mixing being done at room temperature, and dispensing the resultant mixture in an open container wherein it was allowed to foam and cure.

Foam A is a polyurethane foam made according to the prior art using lead octoate catalyst.

Foams B to E are poly(isocyanurate-urethanes) made using the double alkoxide catalysts of the invention, Foams B and D using the titania double alkoxide catalyst of Example 8, and C and E using the iron double alkoxide catalyst of Example 5.

Cube-shaped 2 milligram samples of each of the foams were subjected to thermogravimetric analysis to determine weight loss with increasing temperature by placing each cube in a platinum boat in a nitrogen atmosphere, and continuously monitoring the weight while increasing the temperature at a rate of 40° C. per minute. The results of the thermogravimetric analysis are shown in Table 2 below.

TABLE 2

| | Percent weight loss | | | | |
|---|---|---|---|---|---|
| | A | B | C | D | E |
| Temperature (° C.): | | | | | |
| 300 | 3 | 15 | 9 | 8 | 10 |
| 350 | 17 | 33 | 40 | 339 | 30 |
| 400 | 84 | 66 | 81 | 46 | 60 |
| 450 | 98 | --- | --- | --- | --- |
| 500 | 98 | 85 | 90 | 69 | 77 |

The data above show that early thermal degradation occurs faster for the poly(isocyanurate-urethanes), B to E, than for the polyurethane, A. But subsequent heating, i.e., 350° C. and above, shows a more gradual weight loss for the poly(isocyanurate-urethanes) than that observed for the polyurethane, indicating a greater temperature stability of poly(isocyanurateurethanes).

Various modifications and alterations of this invention will become apparent to those skilled in the art without departing from the scope and spirit of this invention, and it should be understood that this invention is not to be unduly limited to the illustrative embodiment set forth herein.

What is claimed is:

1. A process comprising mixing an organic polyisocyanate or isocyanate terminated urethane prepolymer with a metal double alkoxide catalyst and subjecting the resulting mixture to a temperature sufficient to form an isocyanurate product, said catalyst having the formula $$[M_x(QR)_y]_zA$$

wherein M is a metal atom, Q is oxygen or sulfur, R is a monovalent or divalent organic radical having from one to 20 carbon atoms, A is an alkali metal or an alkaline earth metal having the valence of z, and x and y are integers to satisfy the valences of M and QR.

2. The process according to claim 1 wherein said polyisocyanate is diisocyanate.

3. The process according to claim 1 wherein said polyisocyanate is in admixture with a polyol and is selected from the group consisting of polyisocyanate compounds and isocyanate-terminated urethane prepolymers.

4. The process according to claim 1 wherein said temperature is ambient temperature.

5. The process according to claim 1 wherein said catalyst is a coordination compound of a metal alkoxide with an alkali metal or an alkaline earth metal.

6. The process according to claim 5 wherein said metal alkoxide is the metal alkoxide of a monohydric or polyhydric alcohol or thioalcohol.

7. The process of claim 5 wherein said catalyst is a double alkoxide potassium complex of the titanium alkoxide of triethylene glycol.

References Cited

UNITED STATES PATENTS

| | | | |
|---|---|---|---|
| 3,578,662 | 5/1971 | Cornell | 260—248 |
| 2,978,449 | 4/1961 | France et al. | 260—248 |
| 3,097,191 | 7/1963 | France et al. | 260—77.5 |
| 3,248,372 | 4/1966 | Bunge | 260—77.5 |
| 3,622,577 | 11/1971 | Pedersen | 260—248 |

OTHER REFERENCES

Hackh's Chemical Dictionary, 3rd Ed., McGraw-Hill, New York (1944), pp. 32 and 315. Call No. Q D5 H3.

MAURICE J. WELSH, Primary Examiner

H. S. COCKERAM, Assistant Examiner

U.S. Cl. X.R.

8—115.5; 161—190; 260—2.5 AK, 2.5 AW, 18 TN, 37 N, 858